US 6,713,773 B1

(12) United States Patent
Lyons et al.

(10) Patent No.: US 6,713,773 B1
(45) Date of Patent: Mar. 30, 2004

(54) IRRADIATION SYSTEM AND METHOD

(75) Inventors: Stan V. Lyons, Brentwood, CA (US); Steven E. Koenck, Cedar Rapids, IA (US); Brian T. Dalziel, Marion, IA (US); Janette J. Kewley, Marion, IA (US)

(73) Assignee: Mitec, Inc., Cedar Rapids, IA (US)

( * ) Notice: Subject to any disclaimer, the term of this patent is extended or adjusted under 35 U.S.C. 154(b) by 365 days.

(21) Appl. No.: 09/685,779

(22) Filed: Oct. 10, 2000

Related U.S. Application Data

(60) Provisional application No. 60/158,112, filed on Oct. 7, 1999.

(51) Int. Cl.[7] .............................. G21K 5/00; G21G 5/00
(52) U.S. Cl. .................... 250/492.3; 378/64; 378/69; 378/68; 250/453.11
(58) Field of Search ............. 250/492.3, 208.1, 250/453.11; 378/64, 68, 69

(56) References Cited

U.S. PATENT DOCUMENTS

| | | | |
|---|---|---|---|
| 924,284 A | 6/1909 | Smith | |
| 1,809,078 A | 6/1931 | Smith | |
| 2,095,502 A | 10/1937 | Johnston | 21/54 |
| 2,456,909 A | 12/1948 | Brasch | 21/54 |
| 2,602,751 A | 7/1952 | Robinson | 99/221 |
| 2,741,704 A | 4/1956 | Trump et al. | 250/49.5 |
| 2,816,231 A | 12/1957 | Nygard | 250/43 |
| 2,824,969 A | 2/1958 | Crowley-Milling | 250/49.5 |
| 2,963,369 A | 12/1960 | Urbain | 99/107 |
| 2,989,735 A | 6/1961 | Gampertz | 540/174 |
| 3,087,598 A | 4/1963 | Clore | 98/58 |
| 3,224,562 A | 12/1965 | Bailey et al. | 9/131 |
| 3,261,140 A | 7/1966 | Long et al. | 53/22 |
| 3,396,273 A | 8/1968 | Brunner | 250/52 |
| 3,452,195 A | 6/1969 | Brunner | 250/52 |
| 3,560,745 A | 2/1971 | Petersen et al. | 250/83 |
| 3,564,241 A | 2/1971 | Ludwig | 250/52 |
| 3,567,462 A | 3/1971 | Silverman et al. | 99/157 |
| 3,676,673 A | 7/1972 | Coleman | 250/49.5 |
| 3,676,675 A | 7/1972 | Ransohoff et al. | 250/52 |
| 3,876,373 A | 4/1975 | Glyptis | 21/54 |
| 3,974,391 A | 8/1976 | Offermann | 250/492 |
| 4,013,261 A | 3/1977 | Steigerwald et al. | 250/453 |
| 4,066,907 A | 1/1978 | Tetzlaff | 250/453 |
| 4,151,419 A | 4/1979 | Morris et al. | 250/453 |
| 4,201,920 A | 5/1980 | Tronc et al. | 250/492 |
| 4,281,251 A | 7/1981 | Thompson et al. | 250/398 |
| 4,484,341 A | 11/1984 | Luniewski | 378/69 |
| 4,652,763 A | 3/1987 | Nablo | 250/492.3 |
| 4,663,532 A | 5/1987 | Roche | 250/400 |
| 4,757,201 A | 7/1988 | Kanter | 250/337 |
| 4,760,264 A | 7/1988 | Barrett | 250/453.1 |
| 4,767,930 A | 8/1988 | Stieber et al. | 250/396 |
| 4,785,178 A | 11/1988 | Lynch et al. | 250/497.1 |
| 4,788,701 A | 11/1988 | Barrett | 378/69 |
| 4,852,138 A | 7/1989 | Bergeret et al. | 378/69 |
| 4,864,595 A | 9/1989 | Barrett | 378/69 |
| 4,866,281 A | 9/1989 | Bosshard | 250/453.1 |
| 4,870,368 A | 9/1989 | Putnam | 328/233 |
| 4,908,221 A | 3/1990 | Barrett | 426/240 |
| 4,974,503 A | 12/1990 | Koch | 99/451 |
| 5,004,926 A | 4/1991 | Vassenaix et al. | 250/492.3 |

(List continued on next page.)

Primary Examiner—Jack Berman
Assistant Examiner—Johnnie L Smith, II
(74) Attorney, Agent, or Firm—Kinney & Lange, P.A.

(57) ABSTRACT

An irradiation system includes a radiation source for providing a radiation beam at a controlled power level. A product location system provides product so that the radiation beam impinges on the product. A sensor system measures an intensity of the radiation beam that passes through the product, and a control system adjusts the power level of the radiation beam based on the intensity of the radiation beam that passes through the product.

9 Claims, 14 Drawing Sheets

U.S. PATENT DOCUMENTS

| | | | |
|---|---|---|---|
| 5,008,550 A | 4/1991 | Barrett | 250/453.1 |
| 5,026,983 A | 6/1991 | Meyn | 250/233 R |
| 5,096,553 A | 3/1992 | Ross et al. | 204/157.15 |
| 5,101,168 A | 3/1992 | Miller | 328/233 |
| 5,323,442 A | 6/1994 | Golovanivsky et al. | 378/119 |
| 5,362,442 A | 11/1994 | Kent | 422/22 |
| 5,366,746 A | 11/1994 | Mendenhall | 126/521 |
| 5,396,071 A | 3/1995 | Atwell et al. | 250/358.1 |
| 5,396,074 A | 3/1995 | Peck et al. | 250/453.11 |
| 5,400,382 A | 3/1995 | Welt et al. | 378/69 |
| 5,434,421 A | 7/1995 | Burth et al. | 250/434 |
| 5,451,790 A | 9/1995 | Enge | 250/436 |
| 5,461,656 A | 10/1995 | Golovanivsky et al. | 378/66 |
| 5,470,597 A | 11/1995 | Mendenhall | 126/521 |
| 5,482,726 A | 1/1996 | Robinson, Jr. | 426/238 |
| 5,530,255 A | 6/1996 | Lyons et al. | 250/492.3 |
| 5,554,856 A | 9/1996 | Bidnyy et al. | 250/455 |
| 5,557,109 A | 9/1996 | Bidnyy et al. | 250/455 |
| 5,590,602 A | 1/1997 | Peck et al. | 104/88.01 |
| 5,593,713 A | 1/1997 | De La Luz-Martinez et al. | 426/237 |
| 5,597,597 A | 1/1997 | Newman | 426/248 |
| 5,603,972 A | 2/1997 | McFarland | 426/240 |
| 5,635,714 A | 6/1997 | Nablo et al. | 250/305 |
| 5,661,305 A * | 8/1997 | Lawrence et al. | 250/492.3 |
| 5,690,978 A | 11/1997 | Yin et al. | 426/237 |
| 5,801,387 A | 9/1998 | Nablo et al. | 250/492.3 |
| 5,834,744 A | 11/1998 | Risman | 219/697 |
| 5,838,760 A | 11/1998 | Moses | 378/119 |
| 5,847,401 A | 12/1998 | McKeown et al. | 250/396 |
| 5,881,534 A | 3/1999 | Ahlqvist et al. | 53/403 |
| 5,966,457 A * | 10/1999 | Lemelson | 382/141 |
| 5,994,706 A | 11/1999 | Allen et al. | 250/454.11 |
| 6,023,497 A | 2/2000 | Takahashi et al. | 378/57 |
| 6,027,754 A | 2/2000 | Bushnell et al. | 426/238 |
| 6,051,185 A | 4/2000 | Beers | 422/22 |
| 6,066,348 A | 5/2000 | Yuan et al. | 426/236 |
| 6,086,932 A | 7/2000 | Gupta | 426/237 |
| 6,096,379 A | 8/2000 | Eckhoff | 427/428 |
| 6,127,687 A | 10/2000 | Williams et al. | 250/492.3 |
| 6,232,610 B1 * | 5/2001 | Pageau et al. | 250/474.1 |
| 6,429,444 B1 * | 8/2002 | Korenev et al. | 250/492.3 |
| 6,608,882 B2 * | 8/2003 | Allen et al. | 378/69 |
| 6,617,596 B1 * | 9/2003 | Korenev | 250/492.3 |
| 6,628,750 B1 * | 9/2003 | Korenev | 378/64 |

* cited by examiner

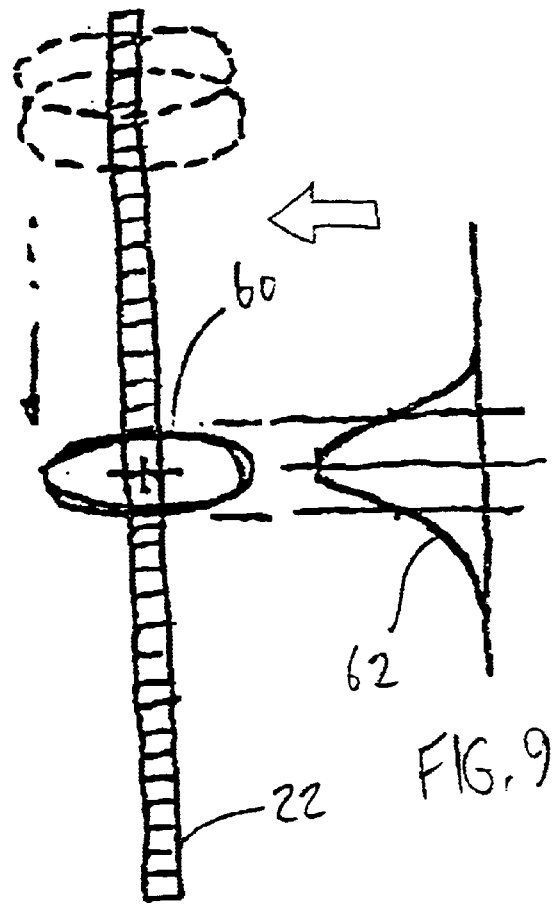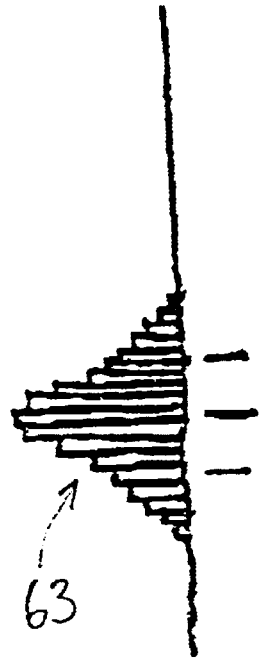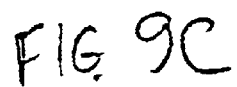
FIG. 9B FIG. 9C
FIG. 9A

IRRADIATION SYSTEM AND METHOD

CROSS-REFERENCE TO RELATED APPLICATION(S)

This application claims the benefit of Provisional Application No. 60/158,112 filed Oct. 7, 1999 for "Irradiation System And Method" by S. Lyons, S. Koenck, B. Dalziel and J. Kewicy.

INCORPORATION BY REFERENCE

The aforementioned Provisional Application No. 60/158,112 is hereby incorporated by reference.

BACKGROUND OF THE INVENTION

The present invention relates to an irradiation system and method, and more particularly to a system capable of delivering a precise item-specific dose of irradiation utilizing dynamic power control and x-ray visioning techniques.

Irradiation technology for medical and food sterilization has been scientifically understood for many years dating back to the 1940's. The increasing concern for food safety as well as safe, effective medical sterilization has resulted in growing interest and recently expanded government regulatory approval of irradiation technology for these applications. The available sources of ionizing radiation for irradiation processing consist primarily of gamma sources, high energy electrons and x-ray radiation. The most common gamma source for irradiation purposes is radioactive cobalt 60 which is simple and effective but expensive and hazardous to handle, transport, store and use. For these reasons, electron beam and x-ray generation are becoming the preferred technologies for material irradiation. An exemplary maximum electron beam energy for irradiation purposes is on the order of 10 million electron-volts (MeV) which results in effective irradiation without causing surrounding materials to become radioactive. The necessary electron beam power must be on the order of 5 to 10 kilowatts or more to effectively expose materials at rates sufficient for industrial processing.

Electron beam and x-ray irradiation systems both employ an electron accelerator to either emit high velocity electrons directly for irradiation or to cause high velocity electrons to collide with a metal conversion plate which results in the emission of x-rays. A number of electron acceleration techniques have been developed over the past several decades including electrostatic acceleration, pumped cylindrical accelerators and linear accelerators.

Electrostatic accelerators are characterized by the use of a direct current static voltage of typically 30 to 90 kilovolts which accelerates electrons due to charge attraction. Electrostatic accelerators are limited in maximum energy by the physical ability to generate and manage high static voltage at high power levels. Electrostatic accelerators using Cockroft-Walton voltage multipliers are capable of energy levels of up to 1 MeV at high power levels, but the 10 MeV energy level utilized by many systems for effective irradiation is not typically available.

Various types of pumped cylindrical electron beam accelerators have been known and used for many years. These accelerators generally operate by injecting electrons into a cylindrical cavity, where they are accelerated by radio frequency energy pumped into the cylinder. Once the electrons reach a desired energy level, they are directed out of the cylinder toll and a target.

RF linear accelerators have also generally been in use for many years and employ a series of cascaded microwave radio frequency tuned cavities. An electron source with direct current electrostatic acceleration injects electrons into the first of the cascaded tuned cavities. A very high energy radio frequency signal driven into the tuned cavities causes the electrons to be pulled into each tuned cavity by electromagnetic field attraction and boosted in velocity toward the exit of each tuned cavity. A series of such cascaded tuned captivities results in successive acceleration of electrons to velocities up to the 10 MeV level. The accelerated electrons are passed through a set of large electromagnets that shape and direct the beam of electrons toward the target to be irradiated.

A typical industrial irradiation system employs an electron beam accelerator of one of the types described, a subsystem to shape and direct the electron beam toward the target and a conveyor system to move the material to be irradiated through the beam. The actual beam size and shape may vary, but a typical beam form is an elliptical shape having a height of approximately 30 millimeters (mm) and a width of approximately 45 mm. The beam is magnetically deflected vertically by application of an appropriate current in the scan deflection electromagnets to cause the beam to traverse a selected vertical region. As material to be irradiated is moved by conveyor through the beam, the entire volume of product is exposed to the beam. The power of the beam, the rate at which the beam is scanned and the rate that the conveyor moves the product through the beam determines the irradiation dosage. Electron beam irradiation at the 10 MeV power level is typically effective for processing of food materials up to about 3.5 inches in thickness with two-sided exposure. Conversion of the electron beam to x-ray irradiation is relatively inefficient but is effective for materials tip to 18 inches or more with two-sided exposure.

The prior art industrial irradiation systems previously described are typically relatively inflexible and require careful setup calibration and operation to deliver the irradiation dosage required for safe, effective sterilization. The output energy levels are established by the structure of the accelerator and are relatively constant. The output power levels are determined by equipment settings and calibration and may vary significantly.

Prior art irradiation systems of the direct electron beam type typically employ electron beam accelerators to generate a stream of electrons at energy levels of a maximum of 10 MeV. Scanning of the electron beam is performed using magnetic deflection similar to the type used for television raster scan. The dosage of irradiation delivered to a product passing by the accelerator is determined by the power of the beam, the beam scanning speed and the rate that the product is moved by the conveyor through the beam. This dosage is typically set manually by an operator for a given material to be irradiated, and is expected to remain constant at that setting. While this type of system can deliver effective radiation for a homogeneous product line, there are a number of shortcomings associated with the system. First, there are a number of factors that may cause the output power to vary after being set by the operator, including changes in temperature of critical components or shifting of frequency of the critical radio frequency acceleration drive subsystem. Second, it is cumbersome and inefficient to change the irradiation dosage to be delivered by the system if some different product is to be irradiated that requires different exposure. This characteristic of prior art systems generally dictates that the product mix to be irradiated can change very little during the course of processing. Third, there is no indication that irradiation exposure has been delivered to the products. Physical dosimeters must be placed periodically on the conveyor or within packages of products and examined to determine that products have indeed been irradiated at the specified dosage. Until the dosimeters have been verified, all product that has passed through the irradiation system must be held in quarantine awaiting verification that the processing was successful. If there is a failure indicated by an underexposed trailing dosimeter, all of the product that is held in quarantine is of unknown status, with some amount at the front of the batch probably exposed and some amount at the back of the batch probably unexposed. Depending on the severity of the unknown product irradiation implications, the entire batch may have to he destroyed. There is a need in the art for an irradiation system that includes the ability to reliably and accurately measure and control the irradiation exposure of an electron beam or x-ray irradiation system, and that also provides an improved power delivery and control system that provides flexibility in the irradiation dose, speed of conveyance and other parameters of system operation.

BRIEF SUMMARY OF THE INVENTION

The present invention is an irradiation system and method for controllably irradiating product. A radiation source provides a radiation beam at a controlled power level. A product location system provides product so that the radiation beam impinges on the product. A sensor system measures the intensity of the radiation beam that passes through the product, and a control system adjusts the power level of the radiation beam based on the intensity of the radiation beam that passes through the product.

According to one particular aspect of the present invention, the radiation beam provided by the radiation source has at least an x-ray component with an intensity profile that is proportional to the intensity profile of the radiation beam itself, and the sensor system measures the intensity profile of the x-ray component of the radiation beam that passes through the product. The control system also operates to interpret measurements taken by the sensor system to determine a relative location and type of the product that the radiation beam impinges upon, and is responsive to the determined relative location and type of the product to adjust the radiation beam power, the location pattern of successive beams, and/or the speed of advancement of the product location system.

BRIEF DESCRIPTION OF THE DRAWINGS

FIG. 9A is a diagram illustrating a single sensor configuration for use in the irradiation system of the present invention.

FIG. 9B is a graph illustrating the intensity profile of an irradiation pulse generated by the irradiation system of the present invention.

FIG. 9C is a graph illustrating digital sensor measurements representing the intensity profile of the radiation pulse generated by the irradiation system of the present invention.

DETAILED DESCRIPTION

Figure 1A:
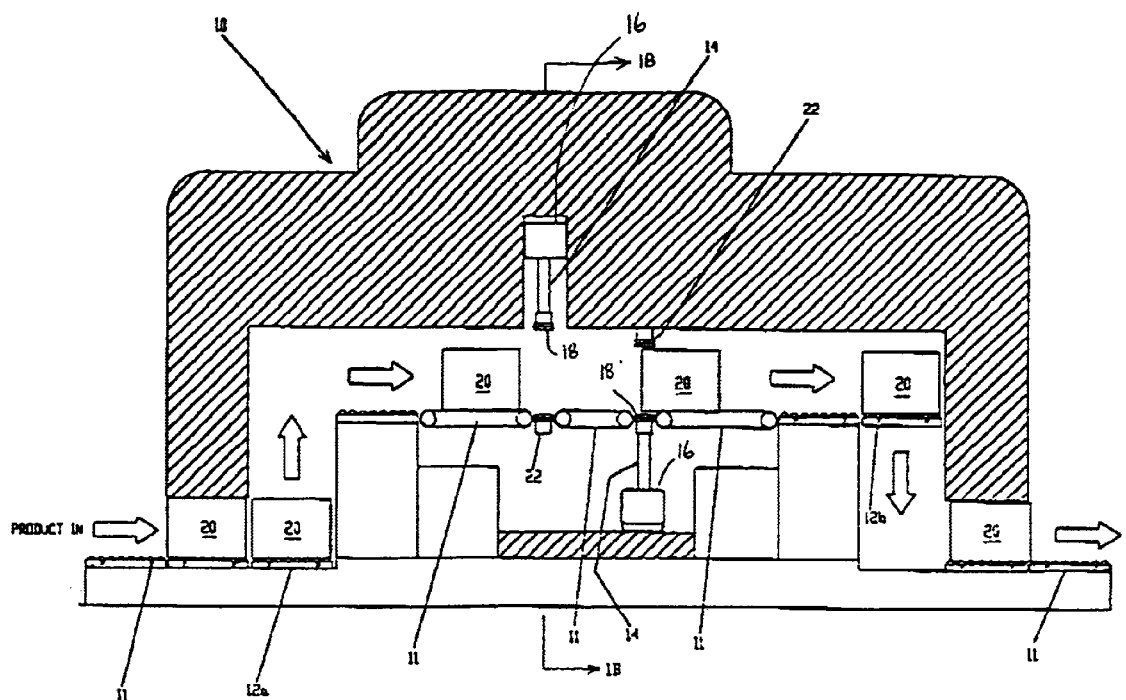
FIG. 1A is a front section view.
Figure 1B:
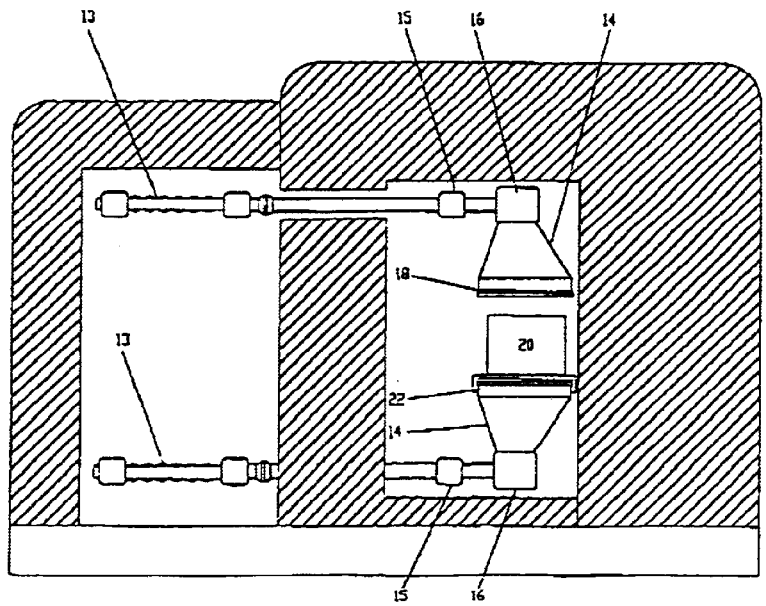
FIG. 1B is a side section view of an irradiation system having a conveyor, elevator, accelerator, scan horn and magnet configuration that includes a radiation sensor array on an opposite side of the conveyor from the accelerator according to the present invention.
Figure 1C:
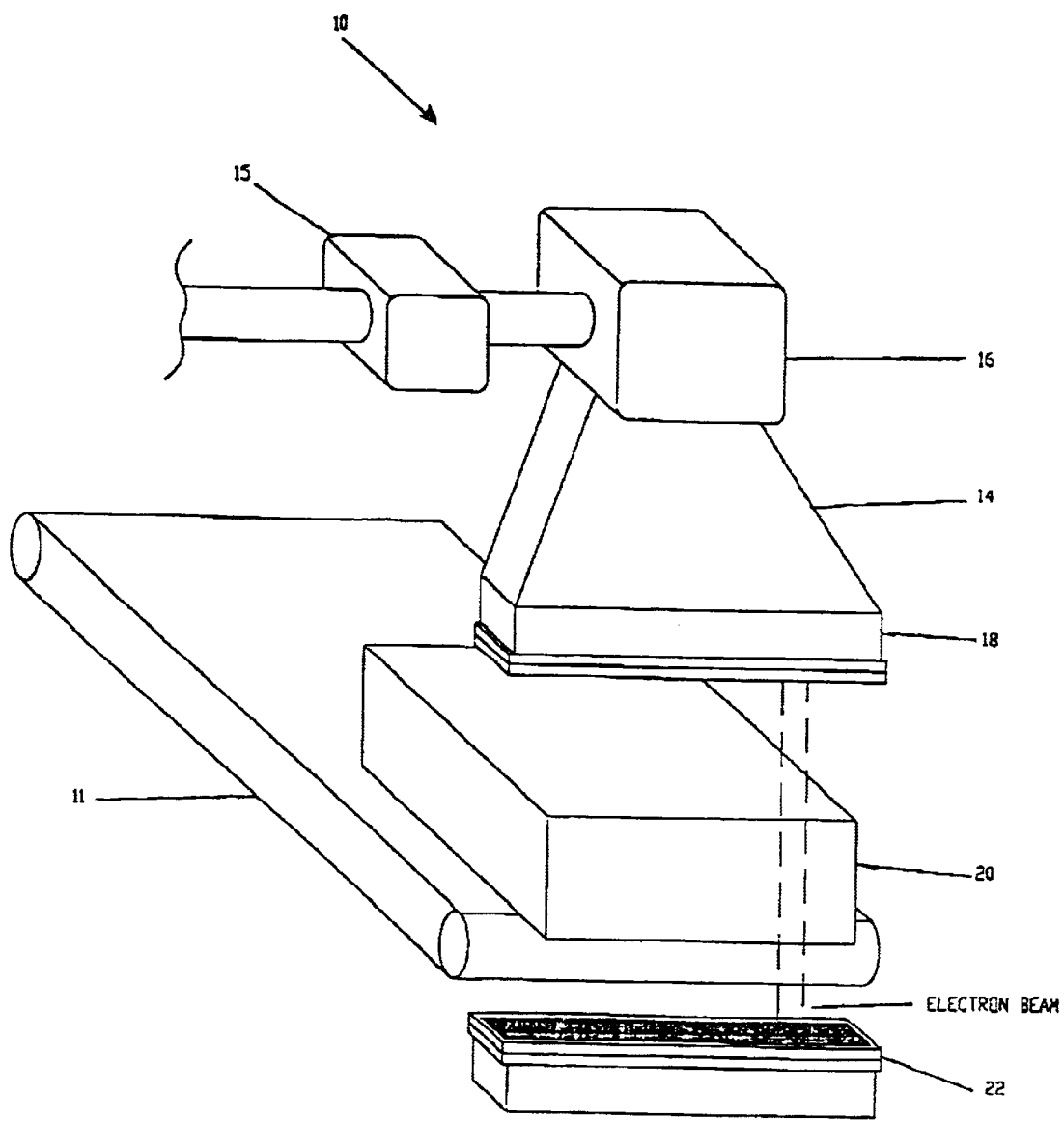
FIG. 1C is a three-dimensional diagram illustrating the accelerator scan horn, sensor array and product conveyor of the irradiation system of the present invention.

FIG. 1A is a front section view and FIG. 1B is a side section view, of irradiation system 10 having product conveyor 11, elevators 12a and 12b, accelerators 13, scan horns 14 and magnet configurations having quadrupole magnets 15, scan deflection magnets 16 and beam straightening magnets 18 for providing an irradiation beam to irradiate products 20. The system also includes radiation sensor array 22 on an opposite side of conveyor 11 for measuring the intensity of the irradiation beam. FIG. 1C is a three-dimensional diagram illustrating accelerator 13, scan horn 14 sensor array 22 and product conveyor 11 in more detail. Irradiation system 10 shown in FIGS. 1A and 1B employs two accelerator 5 with dual scan horns 14 for irradiating products 20 from opposite sides thereof. Other embodiments of the invention may employ a single accelerator with associated beam deflection or steering to deliver two-sided irradiation, or may irradiate from a single side if the beam energy and power is hitch enough. For the purpose of clarity, the operation of the present invention is described primarily as it relates to a single accelerator 13, scan horn 14 and sensor array 22 for single sided irradiation; it should be understood by those skilled in the art that these principles apply equally to irradiation from multiple sides of products 20, utilizing one or more accelerators.

One type of irradiation beam utilized by the system is a high-powered electron beam, which is generated and deflected in a predetermined scan range in a manner known in the art, to provide radiation to products 20 passing by scan horn 14 on conveyor 11. Sensor array 22 is provided in accordance with the present invention to measure the intensity of x-rays emitted as a byproduct of generation of the electron beam as they impinge upon sensor array 22. In another embodiment, the irradiation beam itself may be an x-ray pulse, the intensity of which can then of course be measured by sensor array 22. Sensor array 22 enables a number of determinations to be made in the operation of irradiation system 10. The fact that x-rays are emitted at all, and are detected by sensor array 22, indicates that irradiation system 10 is functioning at least approximately correctly. Sensor array 22 also has the ability to measure the relative intensity of x-rays impinging thereon, which enables sensor array 22 to provide an indication that the system is performing at the appropriate output power level. This basic capability is sufficient to eliminate the need for product quarantine, since there is a dynamic indication on a product-by-product basis whether irradiation system 10 has delivered the required irradiation dose to products 20.

While a variety of electronic sensors may be used to measure the intensity of the electron beam at sensor array 22, an exemplary technology to realize this capability is a linear x-ray sensor device located directly in line with the output of beam deflection scan horn 14. Although a basic electron beam irradiation system emits relatively low levels of directly generated x-rays, the amount of emitted x-ray energy for the desired x-ray sensing capability may be increased by using a modified exit window plate. The modified exit window plate may be made up of a combination of the typically used titanium material and a very thin layer of high atomic number material to enhance x-ray generation. Additionally, an attenuator plate may be placed in front of sensor array 22 to scale the detection sensitivity appropriately between the full output power and the dynamic range of sensor array 22. For example, one suitable device for implementing sensor array 22 is a TH 9591 x-ray linear detector assembly manufactured by Thomson Tubes Electroniques of France. Although this exemplary sensor assembly is designed with a dynamic range between 20 keV and 160 keV, scaling can be performed either by the addition of the attenuator plate or by modification of the sensor assembly itself to provide an effective x-ray sensing range of 0.5 Mve to 10 MeV for the purposes of the irradiation system of the present invention.

Figure 2:
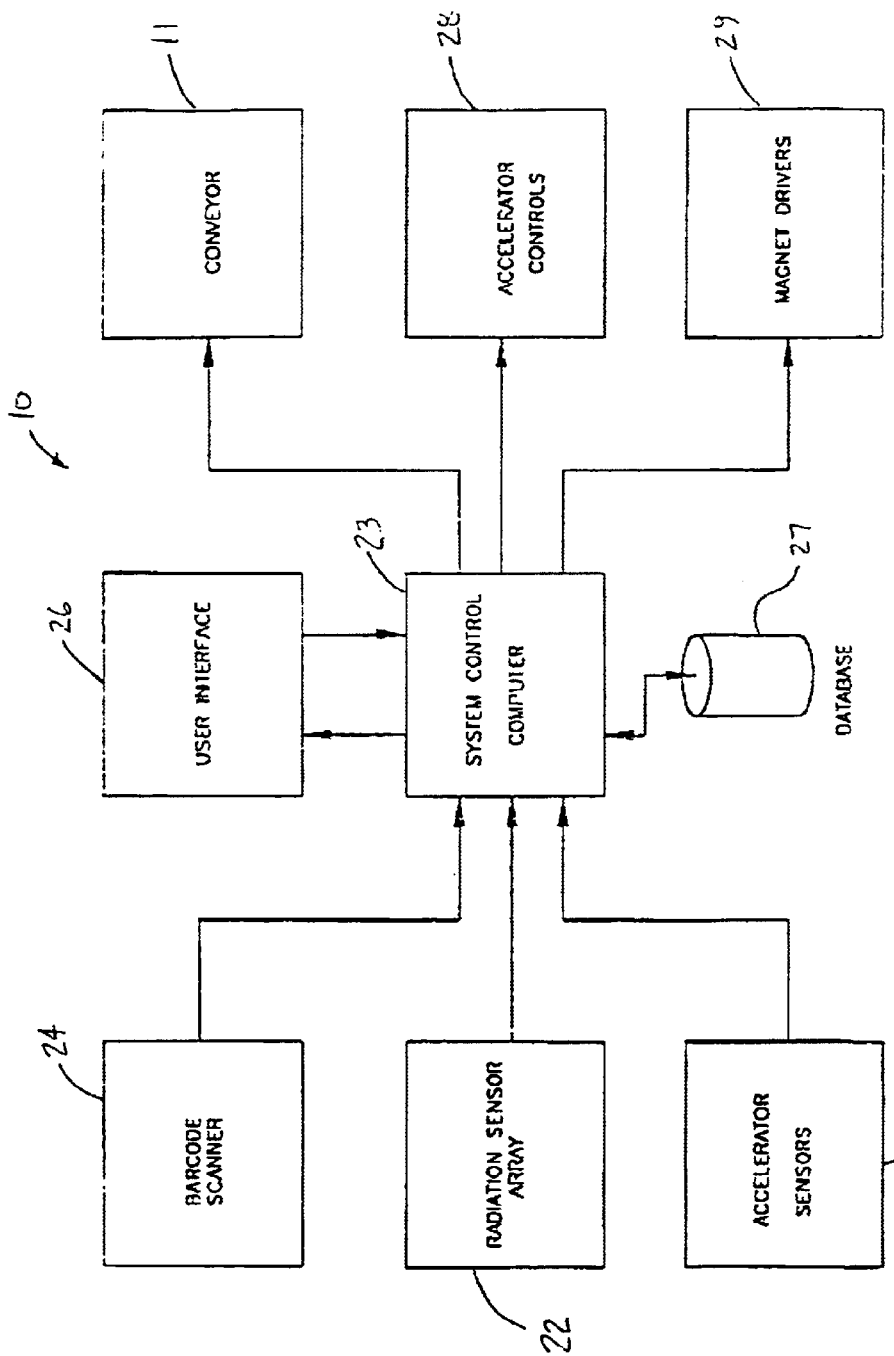
FIG. 2 is a block diagram of the irradiation system illustrating the general control functions performed by the system computer control according to the present invention.

FIG. 2 is a block diagram of irradiation system 10 illustrating the general control functions performed by system computer control 23 according to the present invention. System computer control 23 is operatively connected to coordinate the operations of the functional blocks of irradiation system 10. In one exemplary configuration, system computer control receives input signals from barcode scanner 24, radiation sensor array 22 and accelerator sensors 25, communicates with user interface 26 and database 27 to interpret and analyze the input signals, and operates to control operations of conveyor 11, accelerator controls 28 and magnet drivers 29.

Barcode scanner 24 may be employed in an exemplary embodiment to read an identification barcode from a product to be processed, so as to identify the product and signal system control computer 23 to deliver a specified dose of irradiation, based on product information retrieved from database 27. The signal output by sensor array 22, representative of the intensity of radiation received thereby, is also coupled to a control computer which measures the intensity of the irradiation across the entire scanning region traversed by the output beam of irradiation system 10. Accelerator sensors 25 measure the beam current generated by the accelerator, and input that information to system control computer 23 as well.

In an exemplary embodiment, linear electron beam accelerator 13 (FIG. 1C) employs a high power pulsed accelerator drive subsystem. Such a pulsed accelerator control system is controlled by system control computer 23 in a manner such that dynamic beam power control is achieved. The computer control also regulates the speed of conveyor 11 in order to control the total exposure provided by irradiation system 10.

Scan deflection magnet 15 (FIG. 1C) is controlled by magnet drivers 29 to deflect the electron beam generated by accelerator 13 in a fan-like pattern, which is subsequently converted to a parallel beam pattern with consistent overlap of successive beam pulses by beam straightening magnets 18 at the exit point of scan horn 14 (FIG. 1C). Magnet drivers 29 operate under the control of system control computer 23 to regulate the current in scan deflection magnet 15 to determine where the electron beam will be directed. While it is possible to direct an electron beam by the application of a magnetic field, x-rays are generally not directable in that manner, and therefore all beam shaping in x-ray systems must be performed while the beam is in electron beam form, before the beam is converted to x-ray energy at a conversion plate.

Figure 3A:
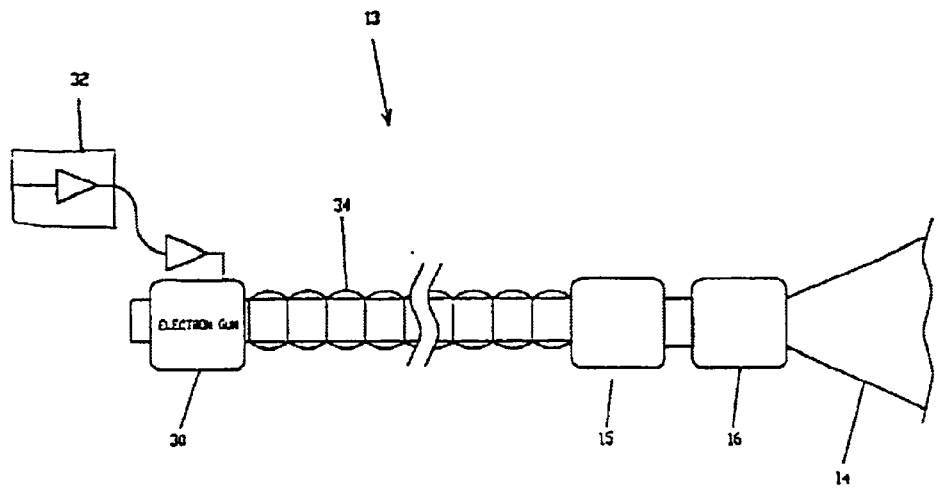
FIG. 3A is a diagram illustrating the construction of a linear accelerator for use in the present invention.

FIG. 3A is a diagram illustrating the construction and control of accelerator 13 in more detail. Accelerator 13 includes electron gun 30 regulated by electron gun control circuitry 32, and also includes resonant cavities 34. The output current of electron gun 30 that injects electrons into resonant cavities 34 is controlled by a signal from electron gun control circuitry 32. This output current is timed to correspond with the RF pulse that drives accelerator 13, so that the amount of current and therefore the number of electrons that ire available to be accelerated may be varied.

Figure 3B:
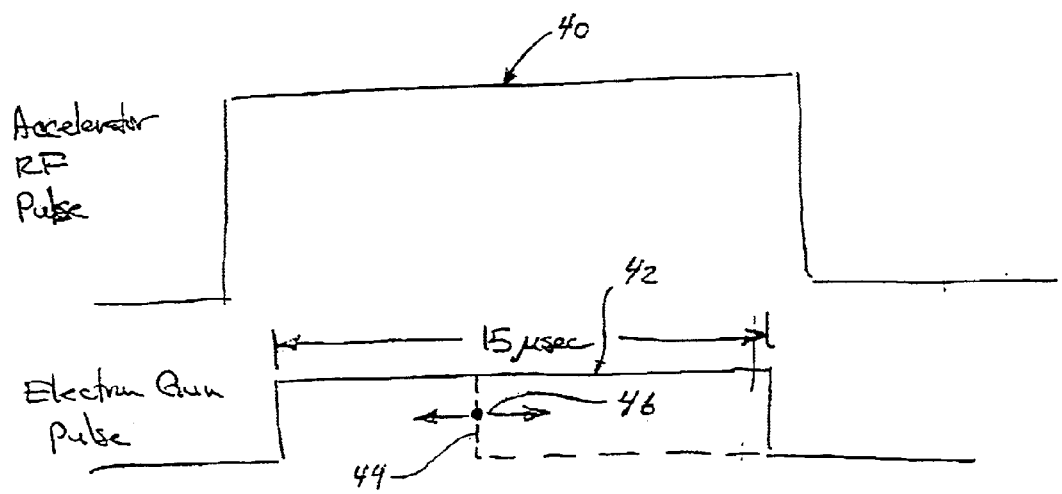
FIG. 3B is a timing diagram illustrating control signals for operating the linear accelerator in the present invention.

FIG. 3B is a timing diagram illustrating RF accelerator drive pulse 40 and electron gun control signal 42 provided by electron gun control circuitry 32. The output power of accelerator 13 is therefore dynamically controllable by varying the pulse width of electron gun control signal 42, illustrated by dashed trailing edge 44 of pulse 42, the timing of which is adjustable as indicated by arrows 46. In addition, the repetition rate of RF accelerator drive pulse 40 and electron gun control signal is also variable, in order to adjust the number of irradiation pulses applied and thereby allow further control over irradiation dosage. The relationship between pulse width and repetition rate and accelerator output power has been shown to be predictable and consistent in linear accelerator research studies, such as the research linear accelerator system employed at Notre Dame University and reported on at the Proceedings of the 1995 IEEE Particle Accelerator Conference held in Dallas, Tex. This controllable output power and repetition rate, in combination with the measurement capability provided by sensor array 22 to measure the actual output power of each beam pulse over the entire scanning region of the beam, enables the creation of an extremely precise, item-specific dose-controlled irradiation system.

Figure 4:
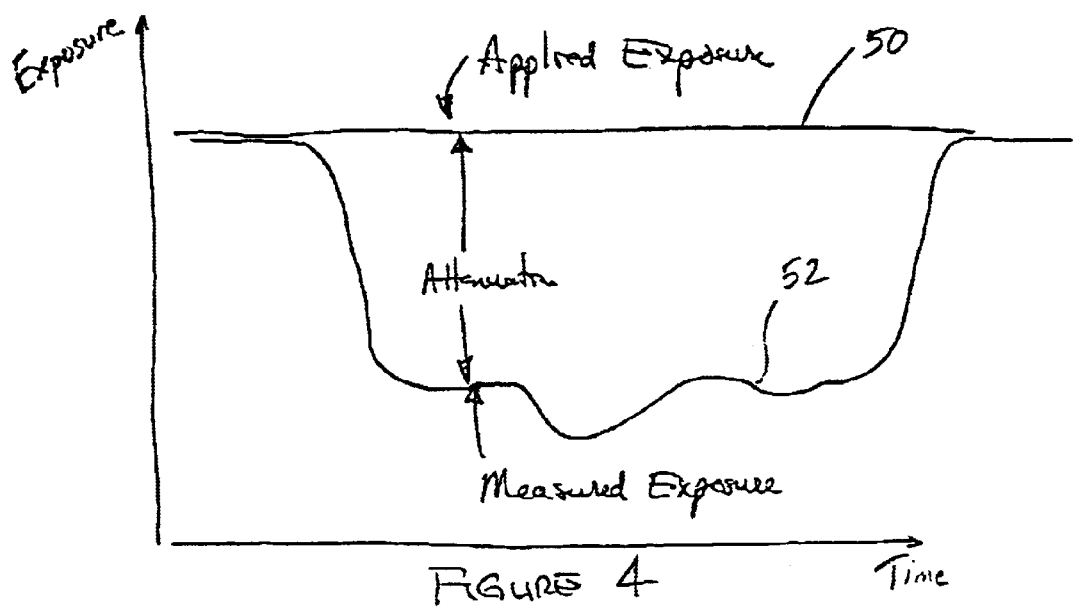
FIG. 4 is a graph illustrating a control mode for ensuring that a maximum exposure level is not exceeded in operation of the present invention.
Figure 5:
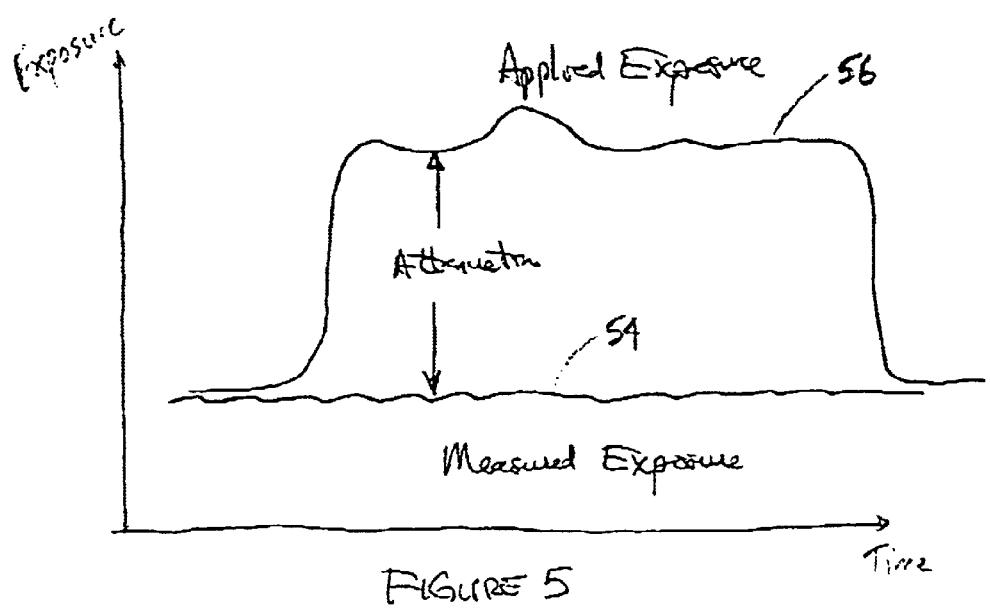
FIG. 5 is a graph illustrating a control mode for ensuring that at least a minimum exposure level is achieved in operation of the present invention.

FIG. 4 is a graph illustrating a control mode for ensuring that a maximum exposure level is not exceeded, and FIG. 5 is a graph illustrating a control mode for ensuring that at least a minimum exposure is achieved. Guaranteeing that a maximum exposure level is not exceeded may be achieved by measuring the intensity of a pulse that is not directed through product (line 50), and is therefore is not attenuated as are pulses directed through product (line 52). The out put power of the system can be set to yield the maximum exposure level desired, so that exposure levels in the product, due to attention, are no greater than the maximum. Conversely, guaranteeing that at least a minimum exposure level is achieved may be accomplished by measuring the intensity of each pulse as it is directed through the product (line 54) with resultant attenuation from the intensity of pulses that do not pass through the product (line 56). The output power of the system can then be set to maintain the exposure as measured at the exit path through the product being irradiated at the minimum exposure level desired. In both control modes, the difference between the applied exposure and the measured exposure is due to the attenuation of the beam in the material being irradiated.

Figure 6:
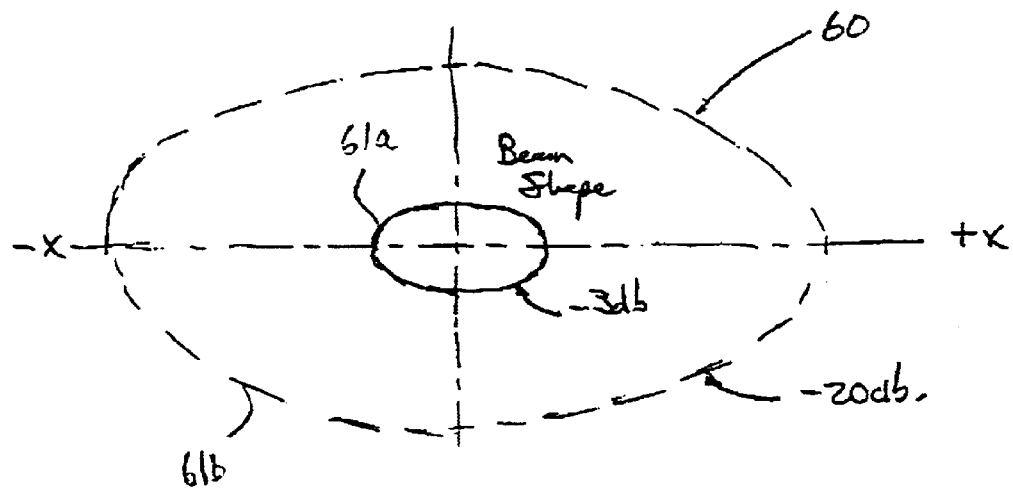
FIG. 6 is a diagram illustrating an generally elliptical irradiation pulse generated in operation of the present invention.
Figure 7:
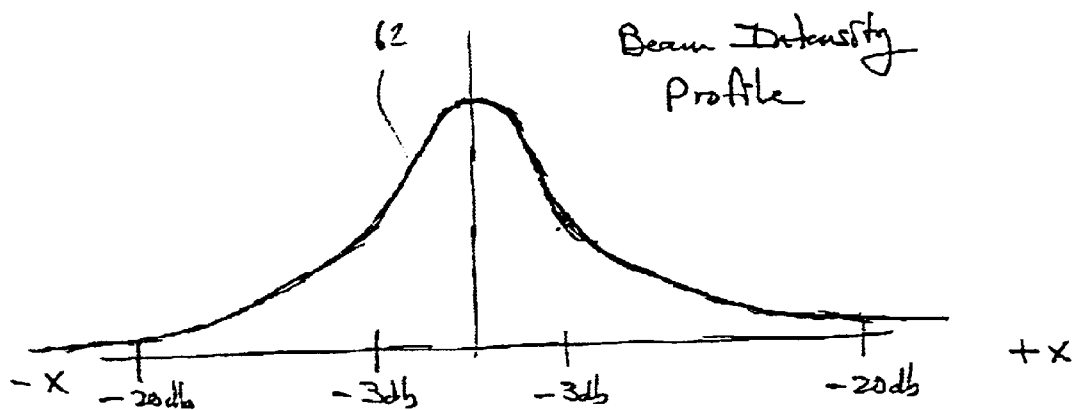
FIG. 7 is a graph illustrating the intensity profile of a typical irradiation pulse generated in operation of the present invention.

FIG. 6 is a diagram illustrating an intensity profile of generally elliptical irradiation pulse 60. The intensity of pulse 60 is inversely proportional to the distance from the center of the pulse. Solid outline 61a shows the portion of pulse 60 that is within 3 dB of the peak pulse intensity, and dashed outline 61b shows the portion of pulse 60 that is within 20 dB of the peak pulse intensity. FIG. 7 is a graph illustrating the intensity profile of a typical irradiation pulse. Line 62 shows the gradual reduction of beam intensity as the distance from the center of the pulse increases. This general shape of beam intensity also holds true for x-rays that are produced as a byproduct of generating an electron beam. Therefore, whether an electron beam or an x-ray beam is used to irradiate products, an x-ray distribution having the intensity characteristic shown in FIG. 7 will be present. By properly configuring the irradiation system the existence of these x-rays may be utilized with advantageous effect, as is described in more detail below.

Figure 8A:
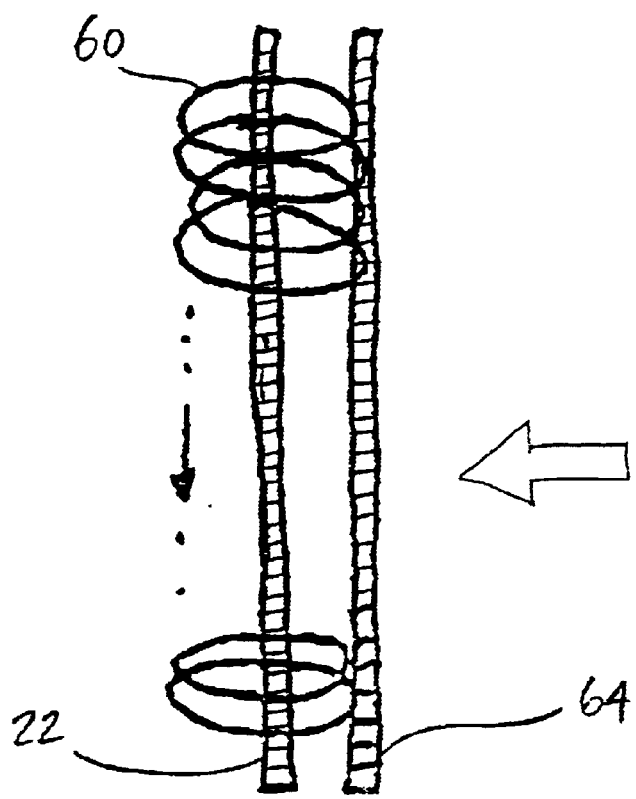
FIG. 8A is a diagram illustrating a dual sensor configuration for use in the irradiation system of the present invention.
Figure 8B:
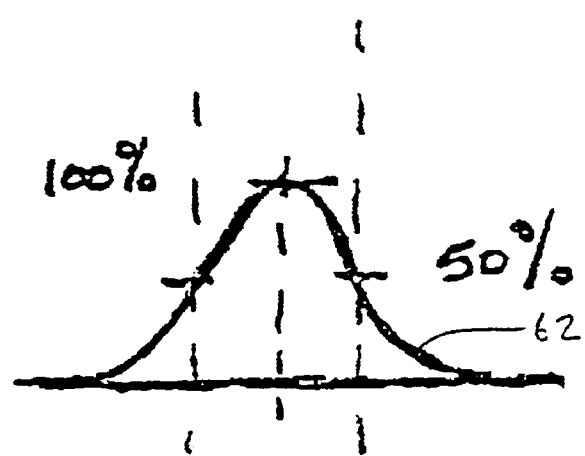
FIG. 8B is a graph illustrating the intensity profile of an irradiation pulse generated by the irradiation system of the present invention.

FIG. 8A is a diagram illustrating a dual sensor system for use in the irradiation system of the present invention, and FIG. 8B is a graph illustrating the intensity profile of an irradiation pulse. The x-rays created when an irradiation pulse is generated may be employed to create an x-ray visioning capability for the irradiation system. One configuration for providing useful features of the visioning capability is to use additional x-ray sensor array 64 upstream from main sensor array 22, with product moving in the direction indicated by the large arrow. Second sensor array 64 serves as a visioning sensor for detecting, the presence of product upstream from the scan horn. The measurements of second sensor array 64 are of x-rays located at a side lobe of irradiation pulses 60, and therefore have a power level that is lower than in the center of pulses 60. Therefore, scaling of the intensity measurements can be performed to give an accurate indication of the physical product profile on the conveyor, based on attenuation of the pulses that is observed when a product is present on the conveyor adjacent second sensor array 64.

FIG. 9A is a diagram illustrating a single sensor that may also be used in the irradiation system of the present invention, FIG. 9B is a graph illustrating the intensity profile of a radiation pulse, and FIG. 9C is a graph illustrating digital sensor measurements representing the intensity profile of the radiation pulse. In the single sensor system, the visioning capability of sensor array 22 is achieved by measuring the x-ray intensity of the vertical side lobe of irradiation pulse 60. Product moves in the direction indicated by the large arrow. As the beam path is scanned downward, the lower vertical side lobe can provide an indication of the density of material slightly below the central portion of current pulse 60. This gives an indication of the presence and relative density of product in the vertical beam traversal path before full irradiation exposure is applied.

In order to properly implement the functions enabled by sensor array 22 (and of additional sensor array 64 in the dual sensor embodiment, FIG. 8), a calibration phase must be performed before irradiating product. A calibration phase is typically accomplished when there is no target product being irradiated, so that the full power of an irradiation pulse is directed at sensor array 22. An electronic sensor is provided, coupled to the linear accelerator, to measure the magnitude of the beam current created by the accelerator and the duration of the current pulse (typically in units of milliamps (mnA) and microseconds ($\mu$s), respectively). A predetermined beam energy (in MeV) multiplied by the measured beam current (in mA) results in a calculated instantaneous beam power of kilowatts (kW). This power value, multiplied by the duty cycle of the accelerator, yields the average power of the irradiation system. The size of the irradiation beam spot is precisely determined by the quadrupole magnets of the system, and the penetration depth/dose characteristic of the irradiation energy is known, meaning that the dose that would be delivered by an individual irradiation pulse to a product may be accurately computed even though no product material receives an irradiation dose during the calibration phase.

X-ray sensor array 22 (as well as additional x-ray sensor array 64 in the dual sensor embodiment, FIG. 8) is an electronic device that measures the intensity of radiation that passes through material being processed. Sensor array 22 is sensitive to x-ray radiation, which is either a byproduct of electron beam irradiation or is the actual radiation used in an x-ray irradiation machine. In either case, the relative signal intensity of each sensor in sensor array 22 is proportional to the amount of x-ray radiation that is received by the sensor. In the case of electron beam irradiation, the product material being processed may absorb the majority of the electron beam energy, but the x-ray radiation is able to penetrate through the product material, and the measured x-ray intensity at sensor array 22 is indicative of the attenuation caused by the absorptive mass of the product material. This attenuation represents the absorption of radiation in the target material, which is the parameter of interest for dose determination.

Figure 10:
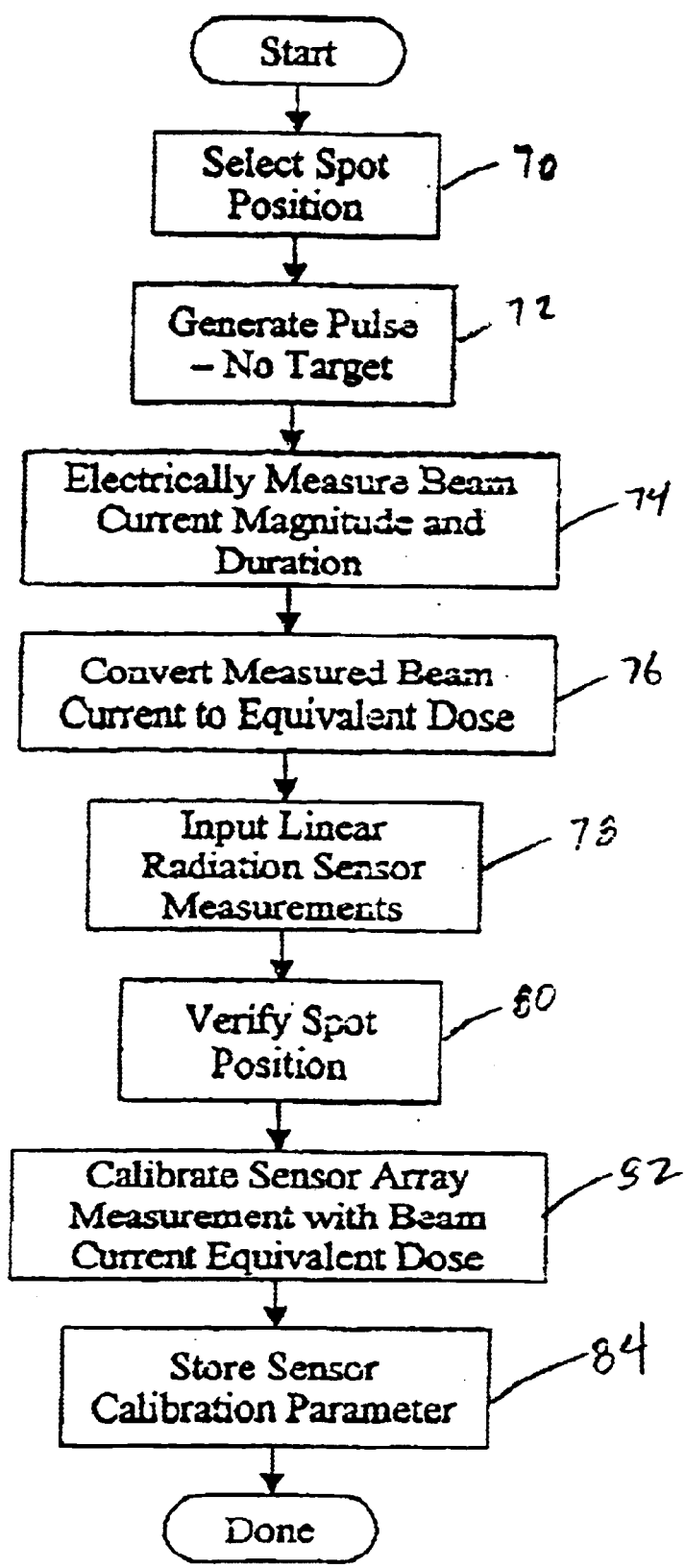
FIG. 10 is a flow diagram illustrating the steps performed in a calibration phase according to an exemplary embodiment of the present invention.

FIG. 10 is a flow diagram illustrating the steps performed in a calibration phase according to an exemplary embodiment of the present invention. An irradiation pulse position is selected by operation of scan deflection magnet 15 (FIG. 1A), as indicated at block 70. A pulse is then generated at block 72, with no product located in the path of the pulse. The magnitude and duration of the beam current signal created by the accelerator is electronically measured at block 74. The measured beam current is then converted by the control computer at block 76 to an equivalent dose by means of a calculation based on the known penetration depth/dose characteristic of the irradiation energy. Measurements of the x-ray radiation intensity at sensor array 22 (FIG. 1A) are then input to the control computer as indicated at block 78. The actual position of the irradiation pulse is verified at block 80, based on the x-ray intensity measurements taken by sensor array 22. The measurements of sensor array 22 are then calibrated and converted at block 82 to correspond to an equivalent irradiation dose, based on the relationship between the known beam current injected into the accelerator and the irradiation dose resulting therefrom. As a result, the proportionality constant between the measurements of sensor array 22 and the irradiation dose provided by the accelerator is determined. This proportionality constant is stored for future conversions of sensor measurements, as indicated at block 84.

Figure 11:
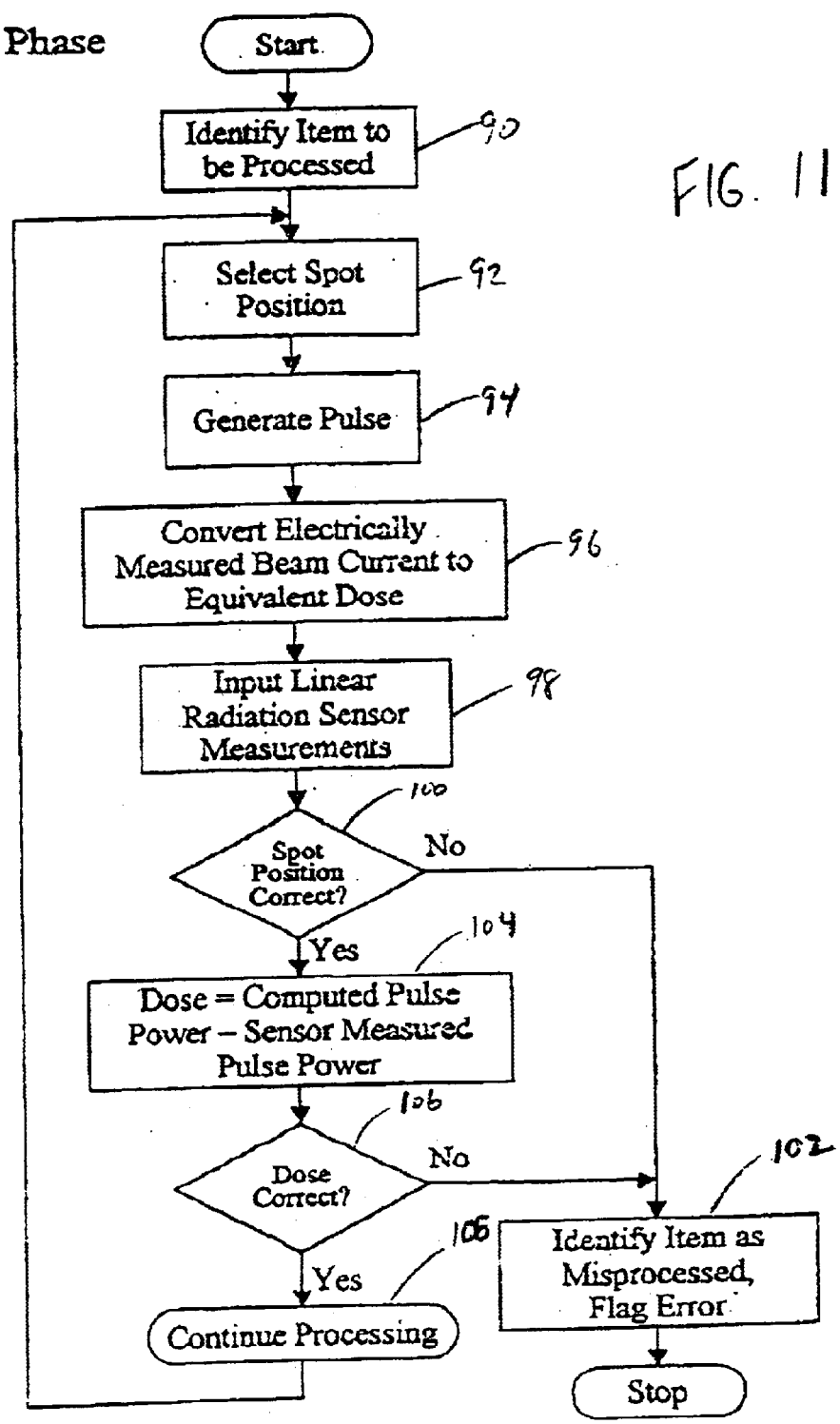
FIG. 11 is a flow diagram illustrating the steps performed in a measurement phase during product irradiation according to an exemplary embodiment of the present invention.

FIG. 11 is a flow diagram illustrating the steps performed in a measurement phase during product irradiation according to an exemplary embodiment of the present invention. In the measurement phase, product is present in the irradiation beam path, meaning that the attenuated ray signal received by sensor array 22 is an indication of the radiation intensity that passes through the material being processed, rather than an indication of the full irradiation beam intensity as in the calibration phase. Thus, in order to determine the dose delivered to the product being processed, the radiation intensity passing through the material being processed is essentially subtracted from the full radiation intensity delivered by the accelerator. Initially, a product to be processed is identified at block 90. An irradiation pulse location is selected by control of the scan detection magnet as indicated at block 92, and a pulse is generated by the accelerator at block 94. The measured beam current is then converted at block 96 to an equivalent dose by means of a calculation based on the known penetration depth/dose characteristic of the irradiation energy, in the same manner as was performed in the calibration phase. Measurements of the x-ray radiation intensity at sensor array 22 are then input to the control computer as indicated at block 98. At this point, a determination is made at block 100 as to whether the actual position of the irradiation pulse corresponds to the desired position selected by control of the scan deflection magnet. If the measured pulse position is incorrect, an error condition is generated at block 102, identifying the product being irradiated as misprocessed. If the pulse position is correct, the irradiation dose absorbed by the product is determined by subtracting the measured pulse power from the computed power of the generated pulse, as indicated at block 104. This absorbed dose is then evaluated to determine if the dose falls within the prescribed level of radiation to be delivered to the product, as indicated at block 106. If the absorbed dose is not correct, an error condition is generated at block 102, identifying the product being irradiation as misprocessed. If the absorbed dose is correct, processing continues as indicated at block 108, and another pulse location is selected at block 92.

The ability of the irradiation system of the present invention to dynamically identify misprocessed products during operation of the system is an extremely useful advance in the art. Prior systems typically introduce chemical dosimeters into the product conveyor flow at predetermined intervals, and determine that misprocessing has occurred only when these dosimeters are removed and analyzed. If a dosimeter were to indicate a dosage error, all of the product between the erroneous dosimeter and the most recent proper dosimeter would have to be held in quarantine and possibly destroyed, which is quite inefficient. The system employed according to the present invention therefore results in substantial processing efficiency improvement.

The processing and measurement methods illustrated in FIGS. 10 and 11 may be used in association with the dual sensor system shown in FIG. 8 or the single sensor system shown in FIG. 9 to implement a visioning system using the radiation source as the source of imaging x-rays. The pulse of radiation for an irradiation dose has an intensity profile as shown in FIG. 7 that can be detected by sensor array 22 (FIGS. 8 and 9) to generate a set of digital measurement values corresponding to the shape of the intensity profile. A sensor location that is offset by a predetermined distance from the center of the pulse profile (such as horizontally offset sensor array 64, FIG. 8, or a vertically displaced sensor of sensor array 22, FIGS. 8 and 9) will have a proportionally reduced signal, which may be calibrated in a manner similar to the calibration method shown in FIG. 10. The resulting calibration factor may then be referenced during a similar visioning measurement function for subsequent radiation pulses in a manner similar to the measurement method shown in FIG. 11. In essence, the only difference between irradiation pulses at the center of the pulse intensity profile and the visioning pulses at the periphery of the pulse intensity profile is the proportional difference in their intensities, which can be taken into account by the calibration scheme illustrated in FIG. 10. For visioning pulses as well as irradiation pulses, a determination is made of the attenuation due to material density in the path of the pulse between the radiation source and the sensor. The measured attenuation is then converted to an equivalent material density. As a result, the visioning pulses may be utilized to dynamically form an image profile of the product material to be irradiated during actual operation of the irradiation system.

The spacing of the radiation sensor element of sensor array 22 is typically much less than the spacing between overlapping radiation pulses. In an exemplary embodiment, the sensor element spacing is about 0.45 mm, while an exemplary pulse height is 30 mm. A high resolution image of the product material being processed may be achieved by using a number of sensor element readings for each radiation pulse. With the vertical deflection of the irradiation beam and the horizontal movement of the product to be irradiated, a two-dimensional image of the product may be determined by the sensor readings under computer control. The attenuation characteristics of the product material adds the third dimension of information, so that the irradiation system may actually generate an accurate three-dimensional model of the product being irradiated. With this capability, such features as product identification may arc enabled. For example, the visioning system could determine that four approximately ellipsoid shaped materials are present inside a container, which could be validated against a computer database to indicate that the container has four whole turkeys packaged therein. Other useful extensions of this capability will be apparent to those skilled in the art.

Figure 12:
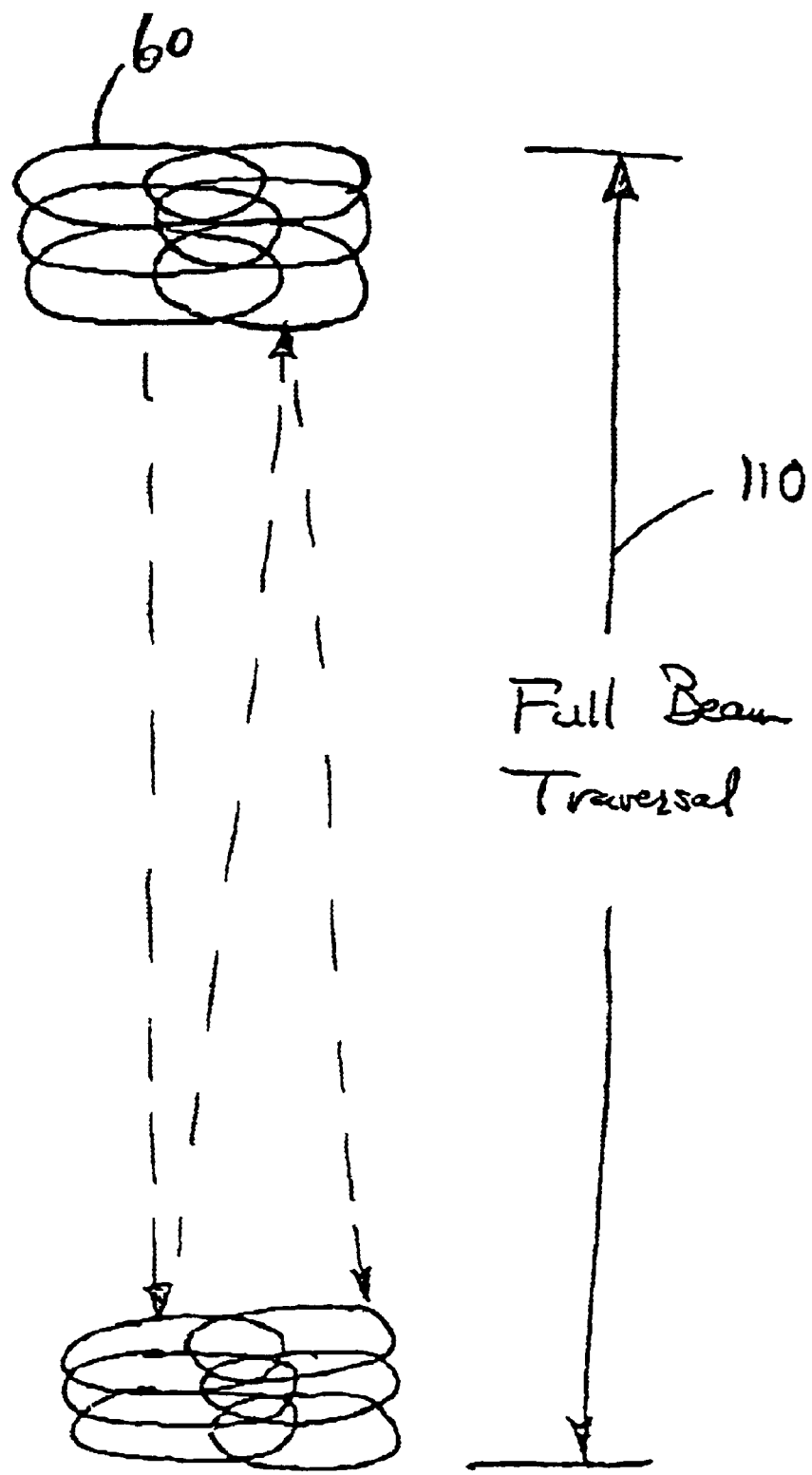
FIG. 12 is a diagram illustrating a conventional irradiation beam sweep for irradiation product.

The visioning function of the irradiation system may be performed in a manner capable of improving the efficiency of the system. FIG. 12 illustrates a typical irradiation beam sweep of full beam traversal 110 for irradiating a product. Irradiation pulses 60 are swept so as to overlap 50% of an adjacent pulse in both the horizontal and vertical directions, with horizontal control being based on conveyor speed and vertical control being based on operation of the scan deflection magnets of the system. The 50% pulse overlap is selected to ensure that the product receives a full predetermined dose of irradiation as the sweep is preformed. However, where a product is not present adjacent to the scan horn, it is possible to reduce the density of the irradiation pulses in the sweep in a sparse "query" pattern.

Figure 13:
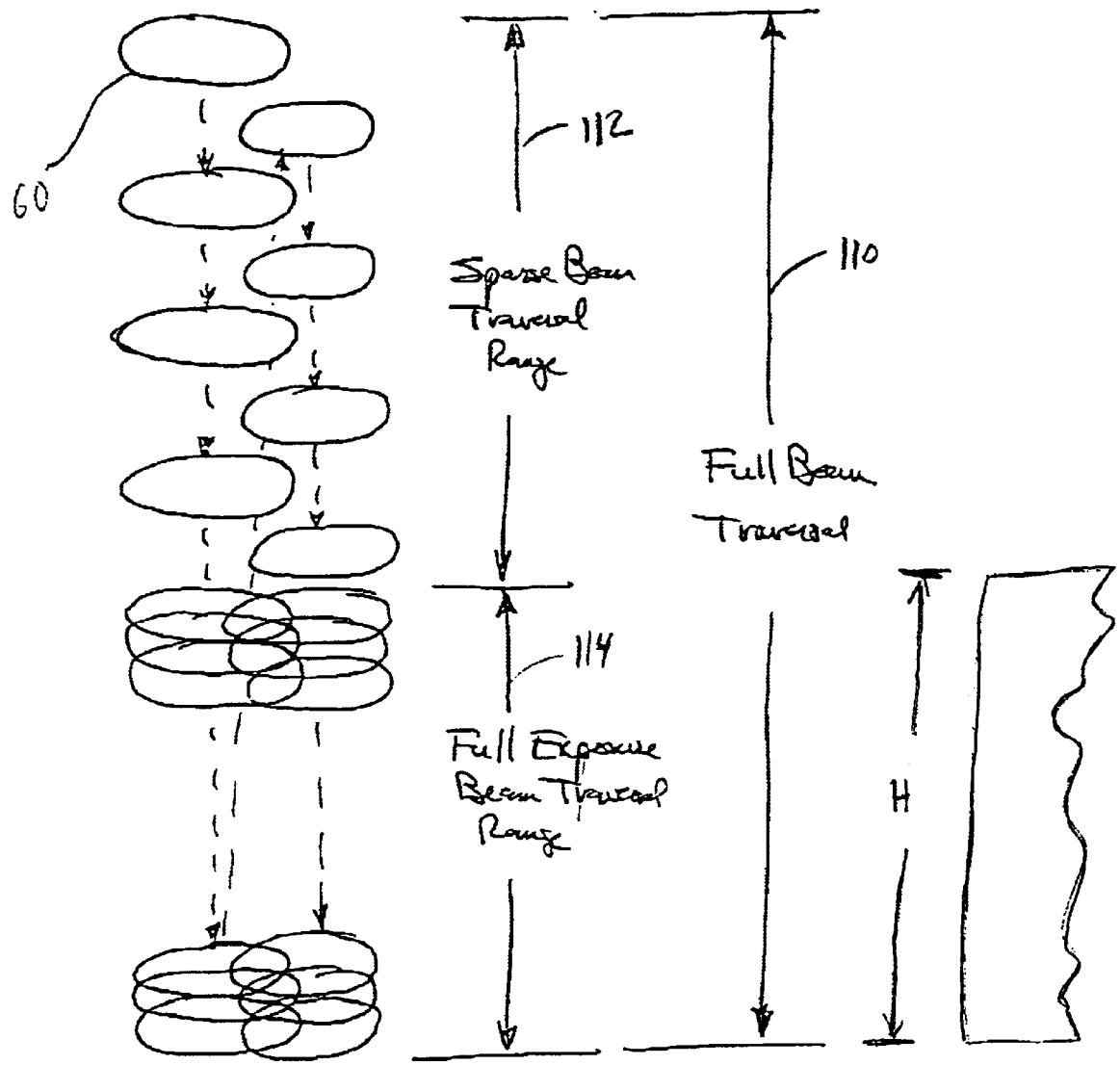
FIG. 13 is a diagram illustrating an irradiation beam sweep utilizing a "query" pattern and a full exposure traversal pattern according to the present invention.

FIG. 13 illustrates an irradiation beam sweep of full beam traversal 110 utilizing a query pattern that includes sparse beam traversal range 112 and full exposure beam traversal range 114 based on detection of a product having height H. When a product is not detected by the sensor array (that is, the irradiation pulse is detected unattenuated), it is possible to sweep the irradiation beam in a sparse "query" pattern, since full exposure of a product is not a concern. Sparse beam traversal range 112 is achieved in the vertical direction by generating fewer irradiation pulses, and in the horizontal direction by increasing the speed of the conveyor. Once a product is detected, the conveyor speed and the frequency of successive irradiation pulses may be adjusted to achieve lull exposure in full exposure beam traversal range 114 Where the product is detected to have a height H, tie beam pattern can remain sparse in sparse beam traversal range 112 since there is no product in that region, reducing the number of irradiation pulses that need to be generated and saving power and extending the life of the irradiation system. The conveyor speed may also be proportionally increased if a series of short products are being processed. The beam deflection, beam power, exposure sensor measurements, visioning sensor measurements and conveyor speed are all operated under coordinated computer control to irradiate products with a predetermined dose of irradiation at the maximum speed permissible, with high efficiency.

While the product location system employed in the irradiation system of the present invention has been described as a conveyor, it should be understood that the principles of the invention, including variation in the speed of advancement of products past the irradiation beam, also apply to other product location systems. For example, a pump-type system maybe used for either discrete products or for bulk material such as fresh ground beef or liquids to be irradiated. Also, the product may be located in a stationary position and scanned in two dimensions, similar to a raster scan, by the irradiation beam to fully process the product with a desired exposure dose. Other variations in the product location system will be apparent to those skilled in the art.

Figure 14:
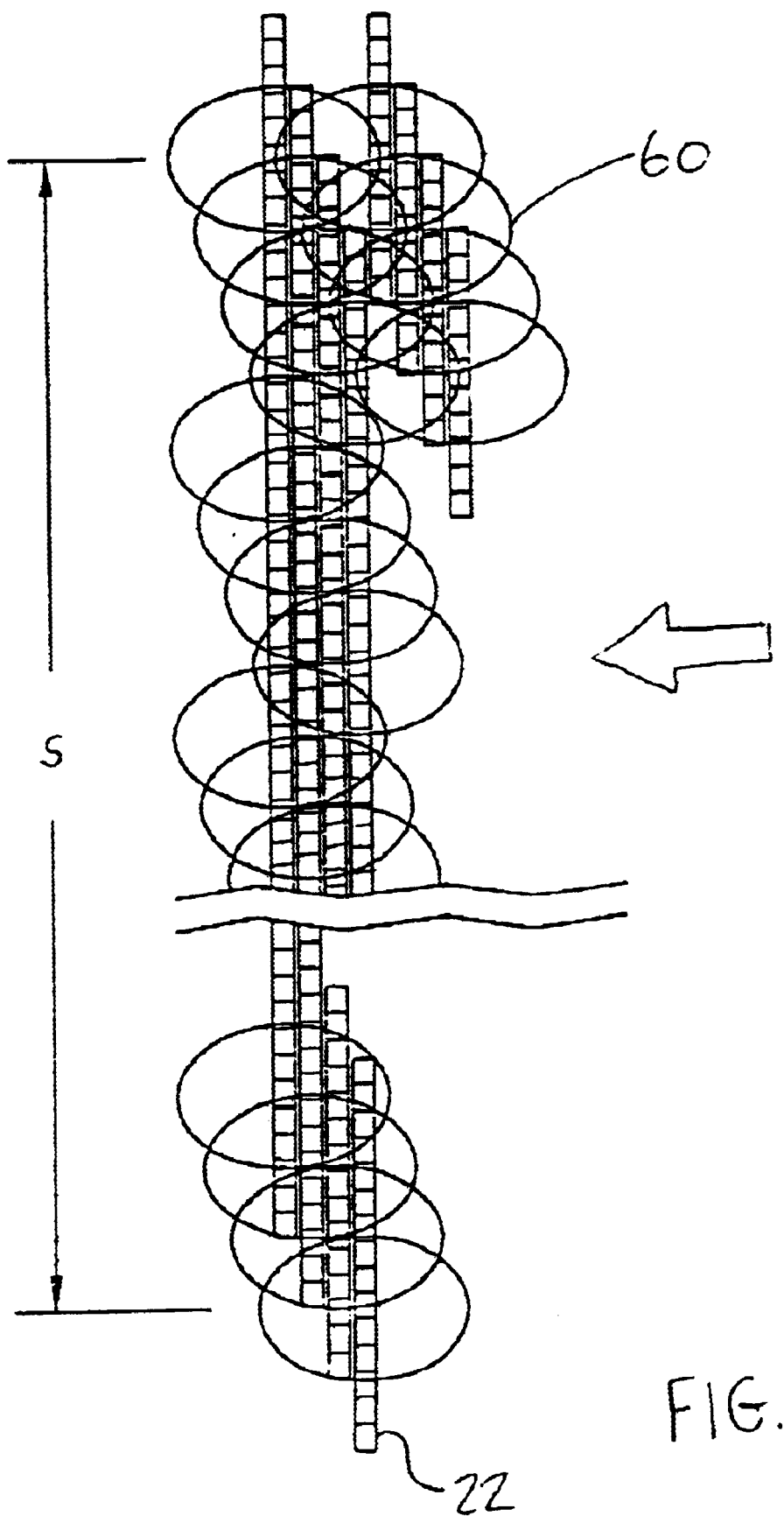
FIG. 14 is a diagram illustrating an irradiation beam sweep utilizing an interleaved beam sweep pattern according to an embodiment of the present invention.

FIG. 14 is a diagram illustrating an irradiation beam sweep utilizing an interleaved beam sweep pattern. An interleaved pulse scan sequence may be used to capture measurements of radiation beam attenuation over both the horizontal and vertical dimensions of the product material being processed. For a given vertical scan traversals with 50% pulse overlap, the number of pulses needed to cover the entire scan traversal is the traversal distance S divided by half the pulse height, rounded up to the next integer, plus one additional pulse. By utilizing an interleaved pattern, the total number of pulses may be divided by an integer number such as four, as is shown in FIG. 14, and a corresponding 4× interleaved scan sequence may be employed. Sensor array 22 is shown in horizontally displaced segments to illustrate its equivalent location as product moves in the direction indicated by the large arrow. If the control computer operates the system so that the rate of four interleaved scans corresponds to horizontal product movement (in the direction of the large arrow) of 50% of the horizontal width of pulse 60, then an equivalent 50% vertical and horizontal pulse overlap is applied, which effectively spreads the visioning radiation and sensor measurements uniformly across the product material to measure pulse attenuation. This method may be employed to create a precise two dimensional array representative of the attenuation of the product material. If the product material is relatively constant in density and equivalent x-ray attenuation, the attenuation is a direct indicator of the thickness of the material. Using this information, it is possible to create an accurate three dimensional representation of the product. This information may be used to validate the product configurations that are believed to be under processing by the system, such as detecting shapes corresponding to whole turkeys in a container, as discussed above.

One possible application of the technology of the present invention is to utilize an irradiation system capable of delivering a number of predetermined doses of irradiation to a number of different types of products. A database of dosage rules maybe maintained in the computer of the irradiation system, and each product on the conveyor may bear an identifier of some kind, such as a bar code or the like, to indicate what type of product is coming next on the conveyor to be irradiated. Once the type of product is identified and the proper dosage rules are retrieved by the computer, the visioning capability of the irradiation system may be operated to perform its size profile function for product locating and scan/conveyor rate optimization, as well as vision-based product verification to ensure that the product has been properly identified.

While the embodiments of the present invention have been described heretofore as utilizing x-rays that occur naturally from the electron beam or x-ray irradiation pulses, it should be understood that it is also possible to implement the present invention by employing a separate low power x-ray generator upstream from the irradiation scan horn of the system. With the addition of such a low power x-ray source, the present invention could potentially be implemented with a prior art irradiation system that lacks the capability to dynamically adjust the power of irradiation pulses emitted, coupled with a computer controlled conveyor having the ability to change speeds upon recognition of the type of material being passed through the irradiation system. The additional x-ray source could be utilized in such an embodiment to identify the item to be irradiated and retrieve appropriate dosage rules in the computer.

Figure 15:
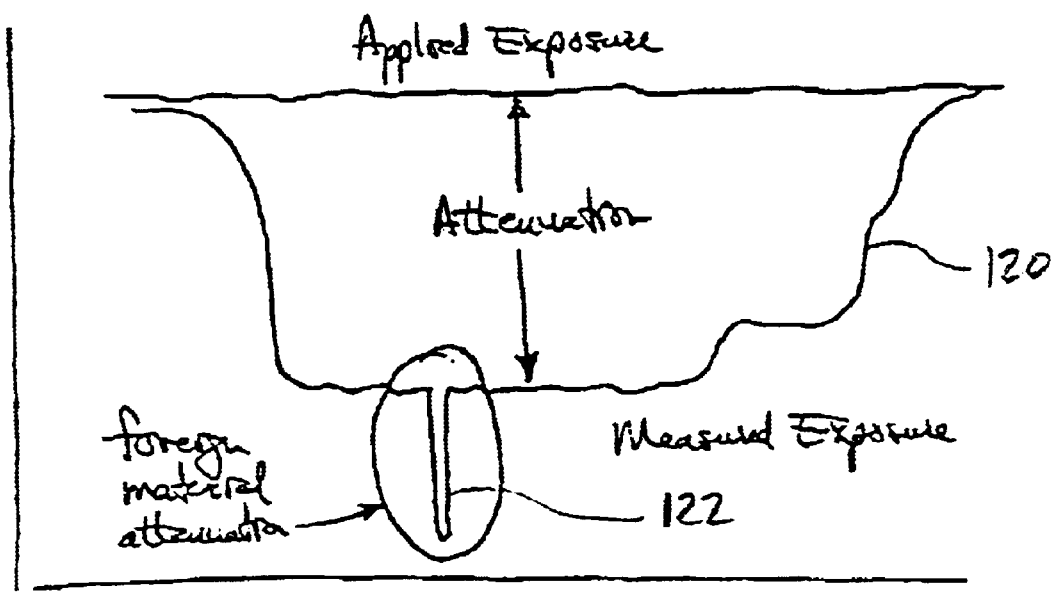
FIG. 15 is a graph illustrating measured levels of irradiation after passing through a product for indicating the presence of a foreign material according to the present invention.

FIG. 15 is a graph illustrating measured levels of irradiation after passing through a product containing a foreign object of some kind. Foreign objects that might be present in a product to be irradiated typically absorb a greater amount of irradiation energy than the product does itself. As a result, measured irradiation characteristic 80 will be affected by attenuation spike 82, indicating the presence of foreign material in the product. The computer controlling the irradiation system is responsive to attenuation spike 82 to signal the operator of the system that the product being irradiated contains an unacceptable foreign object or material, and must be removed from the processing flow. Foreign material detection may be performed in this manner by the main irradiation pulse and sensor array, or by the low power x-ray side lobes or separate visioning source, since attenuation spike 82 will be present in all cases.

The irradiation system of the present invention offers a number of processing features not previously available in the art by providing the capability to (1) sense the intensity of an irradiation pulse on the opposite side of a product conveyor from the scan horn, (2) alter the power of irradiation pulses on a pulse-by-pulse basis, and/or (3) alter the scan density of irradiation pulses. Sensing irradiation intensity allows the system to dynamically determine whether the irradiator is generally operating properly. Based on attenuation characteristics of products to be irradiated and measured intensity levels of irradiation, the intensity of irradiation pulses may be adjusted to ensure that the entire product receives a proper dose of irradiation. This allows computer control to essentially slave irradiation power to conveyor speed, so that variations in conveyor speed are automatically accounted for by adjusting the irradiation power proportionally to the change in conveyor speed. As a result, failures and error conditions that require system shutdown can be avoided for minor aberrations in the operation of the system while ensuring that proper processing occurs.

The irradiation system of the present invention is also able to utilize either side lobes of irradiation pulses or a separate low power x-ray source to identify the location, orientation, density and other physical characteristics of upcoming materials to be irradiated. This information can be utilized to access particular product-specific information such as dosage profiles for individual articles to be irradiated, to enhance the efficiency of the process flow and irradiation pulse scan protocol, and/or to detect the presence of foreign material in the products being irradiated. As a result, the irradiation system of the present invention provides an extremely versatile solution for implementing a precise and efficient processing scheme for irradiation of products.

Although the present invention has been described with reference to preferred embodiments, workers skilled in the art will recognize that changes may be made in form and detail without departing from the spirit and scope of the invention.

What is claimed is:

1. An irradiation system comprising:
   a radiation source for providing an electron beam at a first controlled intensity, the electron beam having a beam current and having at least an x-ray component with a second intensity that is proportional to the first intensity;
   a current sensor coupled to the radiation source for measuring the beam current provided by the radiation source;
   a product location system for advancing the product past the electron beam at a controlled speed, so that the electron beam impinges on the product;
   a sensor system for measuring a third intensity of a portion of the x-ray component of the electron beam that passes through the product;
   a control system for calculating the second intensity of the x-ray component of the electron beam based on the measured beam current provided by the radiation source, and for adjusting the first intensity of the electron beam based on an absorbed radiation dose which is based on a difference between the third intensity of the portion of the x-ray component of the electron beam that passes through the product and the second intensity of the x-ray component of the electron beam.

2. The irradiation system of claim 1, wherein the sensor system includes a scaled linear x-ray sensor array.

3. The irradiation system of claim 2, wherein the sensor system further includes an attenuator plate for scaling the third intensity of the portion of the x-ray component of the electron beam that passes through the product to correspond with a dynamic range of the linear x-ray sensor array.

4. The irradiation system of claim 1, wherein the product location system comprises a conveyor.

5. An irradiation system comprising:
   a radiation source for providing an electron beam having a beam current and having a first intensity profile, the electron beam having at least an x-ray component with a second intensity profile that is proportional to the first intensity profile;
   a current sensor coupled to the radiation source for measuring the beam current provided by the radiation source;
   product location system for providing product so that the electron beam impinges on the product;
   sensor system for measuring a third intensity of a portion of at least part of the x-ray component of the electron beam that passes through the product;
   a control system for calculating the second intensity profile of the x-ray component of the electron beam based on the measured beam current provided by the radiation source, and for interpreting measurements taken by the sensor system to determine a relative location and type of the product that the electron beam impinges upon, the control system being responsive to the determined relative location and type of the product to adjust at least one of the first intensity profile of the electron beam, a location pattern of successive electron beams, and a speed of advancement of product by the product location system.

6. A method of irradiating product, comprising:
   providing an electron beam having a controlled beam current;
   measuring the beam current of the electron beam;
   directing the electron beam onto product;
   measuring an intensity of a portion of the electron beam that passes through the product;
   calculating an intensity of the provided electron beam based on the measured beam current; and
   adjusting the beam current of the provided electron beam to adjust its intensity, based on a difference between the measured intensity of the portion of the electron beam that passes through the product and the calculated intensity of the provided electron beam.

7. The irradiation system of claim 6, wherein directing the radiation beam onto product comprises advancing product past the radiation beam on a conveyor.

8. An irradiation system comprising:
   a radiation source comprising:
     an accelerator for providing an electron beam having a beam current
     a current sensor coupled to the accelerator for measuring the beam current of the electron beam;
     a magnet assembly for controllably shaping and directing the electron beam; and
     a scan horn providing an exit path for the electron beam;
   a product location system for providing product so that the electron beam impinges on the product;
   a radiation sensor system for measuring an intensity of an x-ray portion of the electron beam that passes through the product; and
   a control system for calculating a first radiation dose based on the beam current measured by the current sensor, a second radiation dose based on the intensity of the x-ray portion of the electron beam that passes through the product measured by the radiation sensor, and an absorbed radiation dose based on a difference between the first radiation dose and the second radiation dose, and for adjusting a power level of the electron beam provided by the radiation source based on the absorbed radiation dose.

9. The irradiation system of claim 8, wherein the radiation source further comprises a conversion plate for converting the electron beam into an x-ray beam as the electron beam exits that scan horn.

* * * * *

UNITED STATES PATENT AND TRADEMARK OFFICE
CERTIFICATE OF CORRECTION

PATENT NO. : 6,713,773 B1
DATED : March 30, 2004
INVENTOR(S) : Stan V. Lyons et al.

It is certified that error appears in the above-identified patent and that said Letters Patent is hereby corrected as shown below:

Column 1,
Line 55, delete "arc", insert -- are --
Line 65, delete "toll and", insert -- toward --

Column 2,
Line 8, delete "captivities", insert -- cavities --
Line 33, delete "tip", insert -- up --

Column 3,
Line 12, delete "he", insert -- be --
Line 56, delete "accelerator", insert -- accelerator, --

Column 4,
Line 60, delete "accelerator 5", insert -- accelerators --
Line 65, delete "hitch", insert -- high --

Column 5,
Line 51, delete "Mve", insert -- MeV --

Column 6,
Line 42, delete "ire", insert -- are --

Column 7,
Line 6, delete "out put", insert -- output --
Line 9, delete "attention", insert -- attenuation --

Column 8,
Line 18, delete "(mnA)", insert -- (mA) --

Column 9,
Line 12, delete "ray", insert -- x-ray --
Line 22, delete "detection", insert -- deflection --

UNITED STATES PATENT AND TRADEMARK OFFICE
CERTIFICATE OF CORRECTION

PATENT NO. : 6,713,773 B1
DATED : March 30, 2004
INVENTOR(S) : Stan V. Lyons et al.

It is certified that error appears in the above-identified patent and that said Letters Patent is hereby corrected as shown below:

Column 10,
Line 41, delete "arc", insert -- are --
Line 58, delete "preformed", insert -- performed --

Column 11,
Line 7, delete "lull", insert -- full --
Line 8, delete "114", insert -- 114. --
Line 9, delete "tie", insert -- the --
Line 27, delete "maybe", insert -- may be --
Line 39, delete "traversals", insert -- traversal S --

Column 12,
Line 5 delete "maybe", insert -- may be --

Column 13,
Line 64, delete "product location", insert -- a product location --

Column 14,
Line 1, delete "sensor", insert -- a sensor --
Line 21, delete "a portion", insert -- an x-ray portion --
Line 27, delete "the portion:, insert -- the x-ray portion --

Signed and Sealed this

Twenty-sixth Day of July, 2005

JON W. DUDAS
*Director of the United States Patent and Trademark Office*